United States Patent
Engelfried

(10) Patent No.: US 6,958,588 B2
(45) Date of Patent: Oct. 25, 2005

(54) MACHINE EQUIPPED WITH A TEMPERATURE COMPENSATED LATHE SPINDLE

(75) Inventor: Thomas Engelfried, Baltmannsweiler (DE)

(73) Assignee: Walter AG, Tubingen (DE)

(*) Notice: Subject to any disclaimer, the term of this patent is extended or adjusted under 35 U.S.C. 154(b) by 0 days.

(21) Appl. No.: 10/250,648

(22) PCT Filed: Nov. 5, 2002

(86) PCT No.: PCT/DE02/04099

§ 371 (c)(1),
(2), (4) Date: Dec. 3, 2003

(87) PCT Pub. No.: WO03/039810

PCT Pub. Date: May 15, 2003

(65) Prior Publication Data

US 2004/0113580 A1 Jun. 17, 2004

(30) Foreign Application Priority Data

Nov. 9, 2001 (DE) .......................... 101 55 078

(51) Int. Cl.$^7$ .............................................. G05B 11/01
(52) U.S. Cl. ............... 318/560; 318/568.1; 318/568.16; 700/60; 700/112; 700/114
(58) Field of Search .............................. 318/560, 568.1, 318/568.16, 568.23, 569, 600; 700/60, 112, 114

(56) References Cited

U.S. PATENT DOCUMENTS

| 4,449,085 A | | 5/1984 | Gomoll | |
|---|---|---|---|---|
| 4,559,684 A | * | 12/1985 | Pryor | 29/888.06 |
| 4,896,086 A | * | 1/1990 | Miyahara et al. | 318/568.1 |
| 5,168,453 A | * | 12/1992 | Nomaru et al. | 700/114 |
| 5,280,671 A | * | 1/1994 | Marquart | 29/447 |
| 5,381,339 A | * | 1/1995 | Yoko et al. | 700/112 |
| 6,048,144 A | * | 4/2000 | Bohler et al. | 409/231 |
| 6,415,191 B1 | * | 7/2002 | Pryor | 700/95 |

FOREIGN PATENT DOCUMENTS

| DE | 41 15 564 | 11/1992 |
|---|---|---|
| EP | 0 349 783 | 6/1989 |
| JP | 61-088015 | 5/1986 |

* cited by examiner

Primary Examiner—Rina Duda
(74) Attorney, Agent, or Firm—Burns, Doane, Swecker & Mathis, LLP

(57) ABSTRACT

A machine for machining a workpiece with at least one revolving or rotating tool has a work spindle with a shaft (5), whose temperature is monitored by means of at least one temperature sensor (26). The temperature sensor is detected in contactless fashion. The sensor (26) is preferably a radiation-sensitive sensor, which detects the temperature radiation output. by the shaft (5). In triggering the positioning drive mechanisms, the control unit (35) of the machine (1) takes into account the temperature expansions of the shaft (5) that result from the temperature changes in the shaft. The positioning drive mechanisms serve to position a tool (6), carried by the shaft (5), relative to the workpiece (2). A machining precision is thus achieved that is independent of the temperature and temperature changes of the machine (1) overall, of temperature changes in the coolant—lubricant, and of temperature changes in the tool (6) and the shaft (5), that can all be caused by the power converted at the machining site.

19 Claims, 3 Drawing Sheets

# MACHINE EQUIPPED WITH A TEMPERATURE COMPENSATED LATHE SPINDLE

BACKGROUND

The invention relates to a machine for machining a workpiece with a revolving or rotating tool.

For precision machining of workpieces, such as for grinding, it is necessary that a grinding tool held on a work spindle be positioned with a precision equivalent to the desired precision of the outcome of the work. As a rule, the work spindle is supported on a machine frame via one or more positioning devices. The positioning devices detect the position of the work spindle. To preclude inaccuracies in the positioning that can be caused by temperature changes of the machine frame, machine frames are sometimes provided with temperature sensors, whose signals are taken into account by a control unit that serve to trigger the positioning drive mechanisms. However, this does not make it possible to detect inaccuracies that result from a temperature change between the engagement point of the tool, such as the grinding tool, and the fixed bearing of the work spindle. In those cases, it is therefore often necessary to approach the grinding tool with a measuring feeler in order to re-calibrate the machine. This costs machining time.

OBJECTS AND SUMMARY OF THE INVENTION

Based on the above, it is the object of the invention to create a machine for machining a workpiece with a revolving or rotating tool, which makes increased machining precision and/or improved utilization of time possible.

The machine according to the invention has a contactless temperature detecting device, which generates a signal that characterizes the temperature of the shaft. The temperature is detected at at least one point along the shaft. Thus temperature changes in the shaft of the work spindle that cause a change in its length can be taken into account by the control unit in positioning the tool or the workpiece. This is especially significant in machining operations that lead to alternating shaft temperatures. That happens for instance when machining operations with a variable energy conversion alternate with one another. For instance, if a machine is set up and the grinding operations are relatively brief and are repeatedly interrupted for measurement purposes, then the spindle temperature fluctuates relatively greatly and on average tends to remain low. Conversely, if the machine is operating at full speed in production, the spindle temperature can rise. The difference can exceed a value of 10K. These temperature changes cause changes in shaft length that are in the micrometer range. The control unit detects these changes in length and corrects them by taking the change in length into account in forming the predetermined values from the control values. For instance, if a temperature increase is detected that leads to an increase in the length of the shaft by 1 $\mu$m, then the predetermined values pertaining to the positioning of the work spindle or to its longitudinal orientation are corrected by the same amount, namely 1 $\mu$m, in opposite directions. This operation can run continually, being repeated constantly, for instance at intervals of a few tens of milliseconds. In this way, even brief temperature changes can be detected and precluded before they have an effect. Thus the compensation of the temperature of the shaft occurs in the course of a control operation. The measured temperatures are converted into values for changes in length, by way of a truth table that is present in a memory device belonging to the control unit. The truth table can be varied depending on the tool in order also to detect changes in length that originate in the tool. Instead of the truth table, calculation formulas can also be employed, which from the measured temperature increase or temperature change calculate an increase or change in length.

The inventive concept is fundamentally applicable to any machine for cutting-type machining of a workpiece. It is especially advantageously applicable in a grinding machine that is additionally set up for electroerosive machining. While electroerosive machining takes place at relatively low rpm, for instance 200 rpm, and generates only relatively little heat at the tool, a grinding operation takes place at substantially higher rotary speeds, for instance of 3000 rpm, and with direct contact between the tool and the workpiece, and as a result a relatively large amount of heat is generated. The detection and compensation of the temperature of the shaft creates especially high machining precision in this case.

Detecting the temperature at the shaft is preferably done via a radiation-sensitive temperature sensor in contactless fashion. Contactless detection makes it possible to measure the temperature quickly and precisely, even during machine operation. The sensor is preferably oriented such that a portion of the shaft completely occupies its detection region. The radiation-sensitive sensor thus detects the mean temperature of a cylindrical portion of the shaft. The shaft portion picked up by the sensor is preferably located between the work tool and a bearing device that determines the axial position of the shaft. As a result, the sensor detects the precise region of the shaft whose change in length, if not compensated for, would impair the machining precision.

In an advantageous embodiment, at least two temperature sensors are provided, which detect the temperature of the shaft on both sides of the axially fixed bearing device. This embodiment has the advantage that the shaft can carry at least one tool on both ends, and both shaft portions, of different lengths, can be compensated for in terms of their temperature expansion. There is also the advantage that if both sensors show different temperatures, the conclusion can be drawn that there is a distribution of temperature in the shaft, making it possible to compensate for the change in length even more precisely. In the simplest case, this can be done by means of a linear approximation, for instance. If both sensors show the same temperature, it is assumed that the entire shaft is at a uniform (elevated) temperature. Based on this assumption, the measured temperature values are then used for calculation or other determination of the increase in length that occurs and that needs to be compensated for. However, if one sensor for instance shows a higher temperature while the other sensor shows a lower temperature, it can be assumed that along the shaft a temperature drop prevails, which for instance is constant, and the change in length can then be calculated or determined on the basis of this temperature drop.

It has been found advantageous to provide at least one of the shaft portions that are located in the detection region with a low-reflection surface, for instance a surface coating. For example, the shaft can be burnished. This averts interfering light reflections and makes secure temperature detection possible. It is possible to burnish either a cylindrical region or the entire shaft, as well as to provide the shaft with a matte, blackened, burnished or otherwise-coated surface in only some regions. For instance, longitudinal strips can be attached to the shaft that pass through the viewing field (detection region) of the sensor when the shaft rotates.

This has the advantage that the sensors output an alternating signal whose amplitude is a measure for temperature. Thus direct components and drifting effects, occurring from aging or temperature change of the sensor itself, are filtered out in a simple way.

In addition, the machine can be provided with temperature sensors on the detection region, in order to detect and compensate for temperature changes in the detection region. In conjunction with the temperature compensation of the shaft, especially high precision is attained.

BRIEF DESCRIPTION OF DRAWINGS

Further details of the invention can be learned from the drawing, description, or dependent claims. In the drawing, one exemplary embodiment of the invention is shown:

DETAILED DESCRIPTION OF PREFERRED EMBODIMENT

Figure 1:
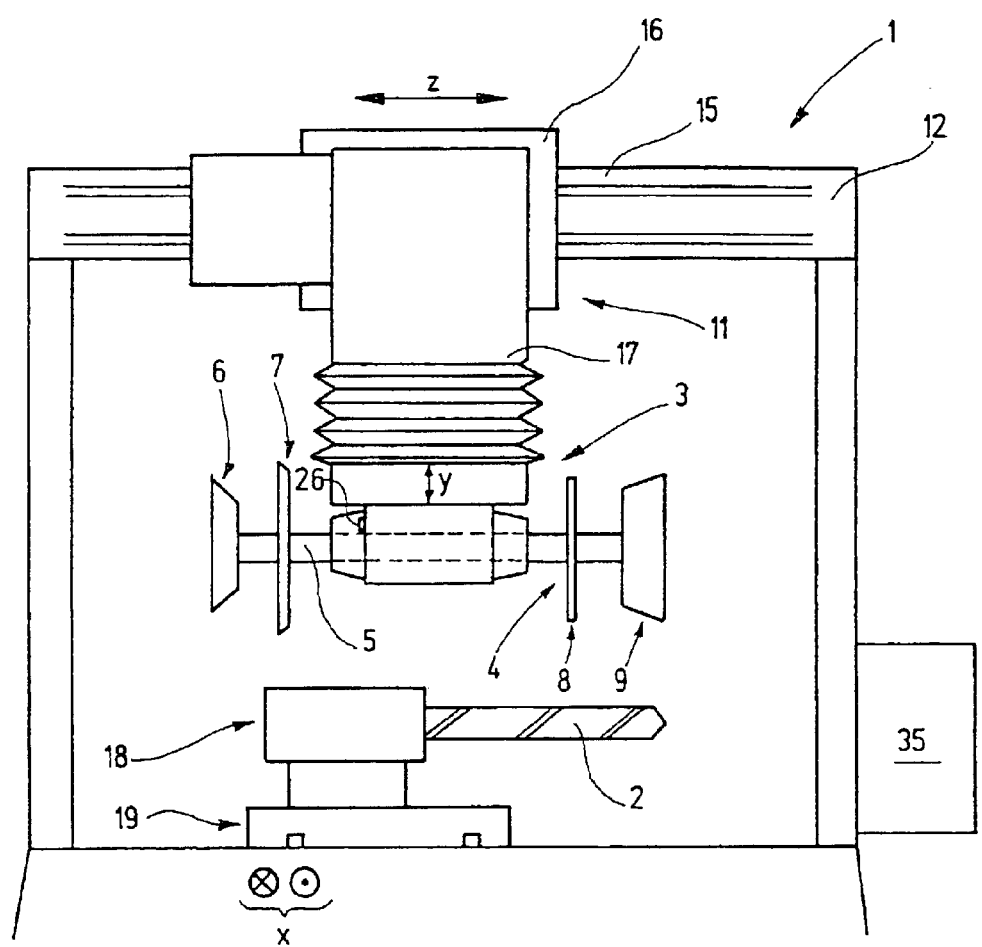
FIG. 1 is a schematic front view of a machine for machining a workpiece.

In FIG. 1, a machine 1 embodied as a grinding machine is shown; it is used to machine tools 2, such as drills, milling cutters, and the like. Thus in the present situation, the tools 2 are the workpieces. For machining them, in the machine shown as an example here, a combined grinding and erosion head 3 is used, which has a work spindle 4. A shaft 5, which carries tools 6, 7, 8, 9, belongs to the work spindle. The tools 6, 7, 8, 9 can be grinding tools, erosion tools, or the like.

The grinding and erosion head 3 is held via a positioning device 11 on a machine frame 12. By way of example, a horizontal positioning device 14, which is formed by a horizontal guide 15, a carriage 16 supported on it, and an associated drive device, belongs to the positioning device 11. The horizontal positioning device 14 serves to position the grinding and erosion head 3 in the Z direction.

The carriage 16 carries a vertical positioning device 17, to which in turn a guide in a drive mechanism as well as suitable position sensors belong. It serves to position the grinding and erosion head 3 in the Y direction.

A chucking device 18 for the tool 2 is also supported on the machine frame. The chucking device 18 can be held positionably in the X direction via a further horizontal positioning device 19. In addition, other pivoting or rotary positioning devices, not shown, can be provided to enable positioning the grinding and erosion head 3 as well as the tool 2 relative to one another in the three linear axis directions X, Y and Z, as well as in one, two or three pivoting directions.

Figure 2:
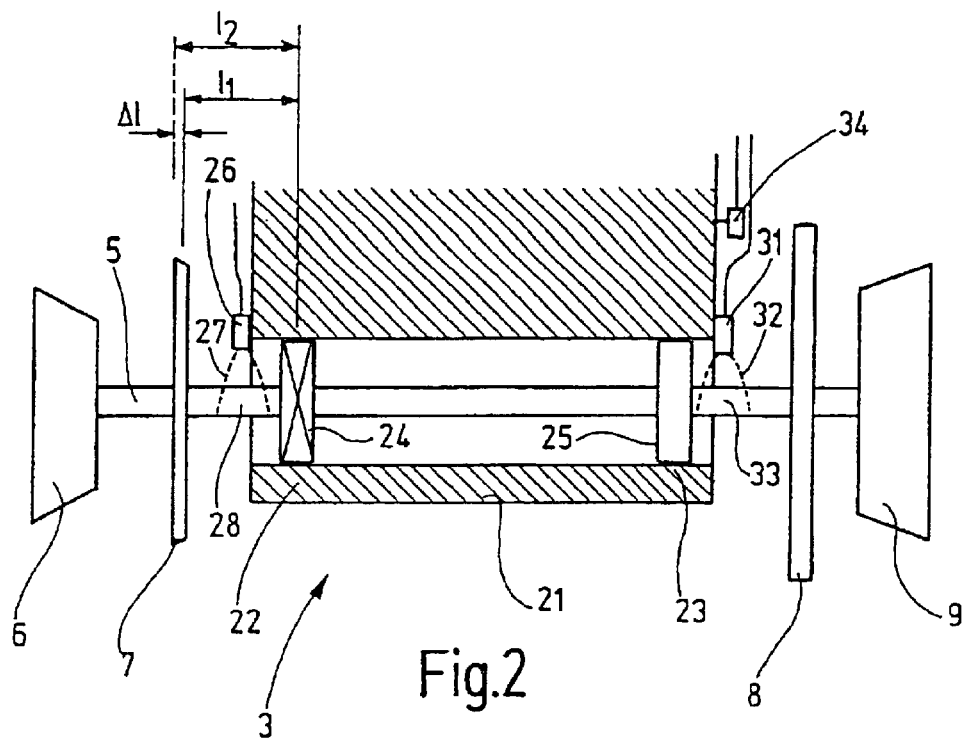
FIG. 2 is a schematic sectional view of the work spindle of the machine of FIG. 1.

The erosion and grinding head 3 is shown separately and in section in FIG. 2. Its base carrier 21 has two bearing seats 22, 23, each of which holds one bearing device 24, 25. The bearing device 24 is a roller bearing that supports the shaft rotatably but axially non-displaceably. The bearing device 25 is a roller bearing that supports the shaft rotatably but at least to a slight extent axially displaceably. The bearings are sealed off from the outside by a sealing device, not further shown. This device may optionally also include a means for supplying blocking air that generates an outward-oriented air stream. This can cause the base carrier 21 and the bearing devices 24, 25 to remain colder than the shaft 5.

During operation, cooling lubricant is as a rule supplied to the grinding tool, which is intended to prevent excessive heating of the grinding tool. The cooling lubricant, whose temperature can vary markedly over the course of a work day, as a rule generates relatively major temperature gradients or temperature differences in the grinding tool and other machine parts. As a result, the temperature of the shaft 5 can differ markedly from the temperature of the bearing devices 24, 25 and of the base carrier 21. If a flow of cooling lubricant that strikes the grinding tool as well as the shaft is turned on or off or even only changed, this can cause relatively brief temperature changes in the shaft 5.

The base carrier 21 carries a radiation-sensitive temperature sensor 26, which has a detection region 27 shown in dashed lines in FIG. 2. The temperature sensor 26 detects the temperature radiation within its detection region 27 and thus the thermal radiation emitted by a shaft portion 28. The temperature sensor 26 is disposed such that the shaft portion 28 located in the detection region 27 is located between the bearing device 24 and the tool 6 or 7. As a result of the direct detection of the temperature of the rotating shaft, even very brief temperature changes in the shaft 5, of the kind that can be caused by the cooling lubricant, can be detected and, as explained hereinafter, immediately neutralized.

If needed, a further temperature sensor 31 can be provided on the base carrier 21, whose detection region 32 is occupied by a shaft portion 33. The temperature sensor 31 can be disposed such that it detects the temperature of the shaft between the bearing devices 24, 25, or, as shown, detects the temperature between the bearing device 25 and the next-closest tool 8.

In addition, a temperature sensor 34 for detecting the temperature of the base carrier can be provided. Still other temperature sensors can be accommodated in the detection region 12 to enable detecting changes in its temperature and thus changes in its dimensions.

Figure 3:
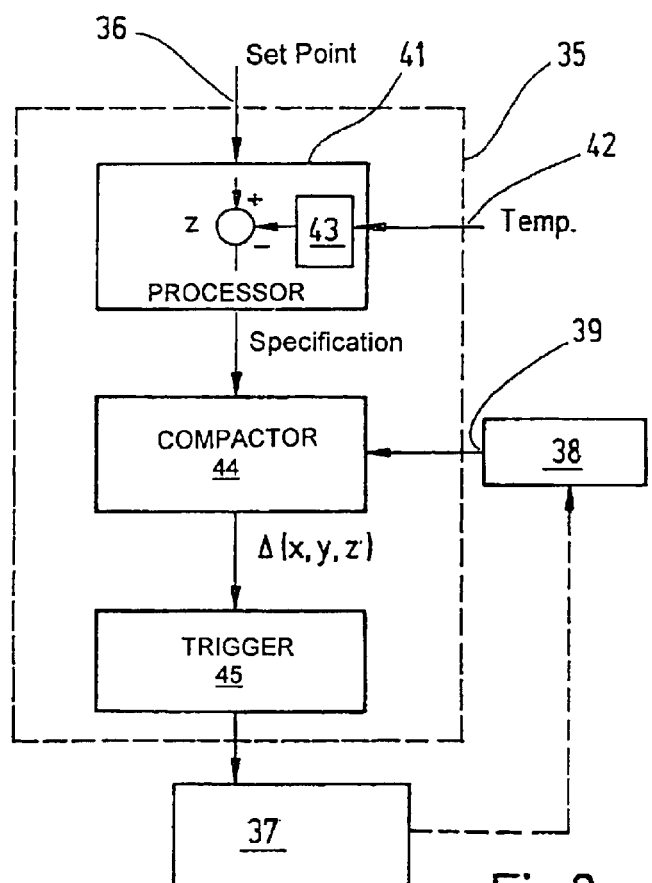
FIG. 3 is a schematic view of a control unit for the machine of FIG. 1.

The machine 1 is subject to the control of a control unit 35, which is shown schematically in FIG. 3. Via an input interface 36, the control unit 35 receives data pertaining to the motions to be performed by the grinding and erosion head 3. These data are provided for instance in the form of machine control instructions, which contain information about travel distances and targets of the positioning devices 11, 17 and 19.

On the output side, the control unit 35 controls drive mechanisms 37 for the positioning devices 11, 14, 17 and 19. These are each provided with sensors 38, which detect the applicable positioning position and report it to the control units via an actual-value interface 39.

The control unit 35 includes a processing block 41, to which all the temperature signals are delivered via a temperature signal interface 42. In particular, the temperature signal interface 42 is connected to the temperature sensor 26 and the temperature sensor 31.

The processing block 41 includes at least one truth table 43 or a corresponding arithmetic or computer module, which converts the detected temperature values of the shaft portion 28 into the associated temperature expansion of the entire shaft end between the bearing device 24 and the tool 6 or 7.

In other words, the truth table 43, from the detected temperature values of the shaft portion 28, determines the temperature-caused shift of the tool 6 and the tool 7. Accordingly, from the temperature signals furnished by the temperature sensor 31, the truth table 43 can calculate or determine the temperature-caused expansion of the shaft portion between the bearing device 24 and the tool 8 or 9. The thus-determined changes in length of the applicable shaft regions of the shaft 5 and the control values obtained via the input interface 36 enter the processing block 41, and are being added with the correct sign to the Z-positioning values. Thus the processing block 41 converts the control values, received at the input interface 36, into predetermined values, which represent corrected control values. The predetermined values are then compared in a comparator block 44 with the positions measured by the sensors 38. Corresponding deviations Δ(X, Y, Z) are output to a triggering block 45, which triggers the drive mechanisms 37.

FIG. 2 shows how the spacing $l_1$ of the tool 7 varies upon a temperature change $\Delta\delta$ from the temperature $\delta_1$ to the temperature $\delta_2$. The change in length $\Delta l$ is at the same time the change in the spacing from the value $l_1$ to the value $l_2$. In the simplest case, the control unit 35 assumes a linear relationship between the change in length $\Delta l$ and the temperature change $\Delta\delta$:

$$\Delta l = l_2 - l_1$$

$$\Delta\delta = \delta_2 - \delta_1$$

$$\Delta l \approx l_1 \cdot \Delta\delta$$

With a material-dependent proportionality constant α, the following equations apply:

$$\Delta l \approx l_1 (\delta_2 - \delta_1 0 = \alpha, \text{ and}$$

$$l_2 = l_1 (1 + \alpha \cdot \Delta\delta).$$

Figure 4:
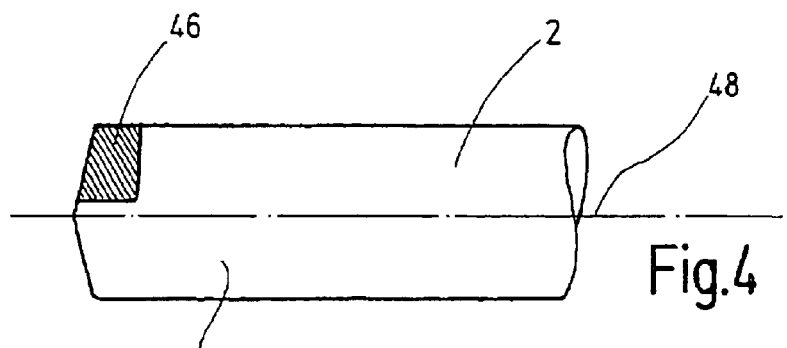
FIG. 4 shows a tool to be machined, which in this case forms the workpiece, on the machine of FIG. 1.

The machine 1 described thus far functions as follows:

To illustrate the effectiveness of the provision according to the invention, it will be assumed that the tool 2 schematically shown in FIG. 4 is supposed to be both electroeroded and ground. In its active region, the tool 2 has a thin plate 46 of diamondlike carbon. This plate is secured to a tool body 47 of tool steel. Such tools 2 are precision tools, whose cutting edges must be manufactured to micrometer accuracy. The plate 46 cannot be secured to the tool body 47 with the desired precision. Postmachining is therefore required and is performed by the machine 1. For the sake of illustration, the tool 2 is shown in FIGS. 5 and 6 in an enlarged view, looking toward its tip, that is, parallel to its axis of symmetry 48.

Figure 5:
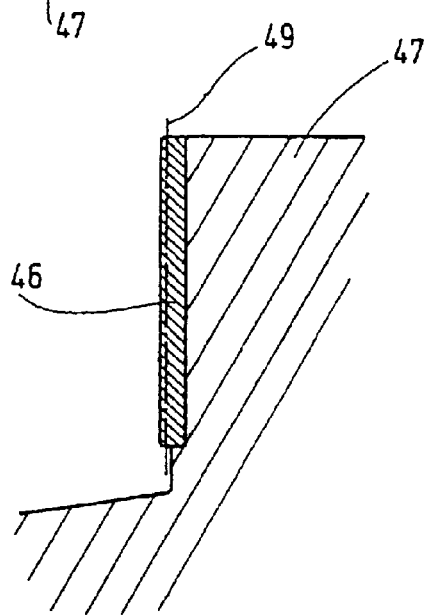
FIGS. 5, 6 show the tool of FIG. 4 in various stages of machining.
Figure 7:
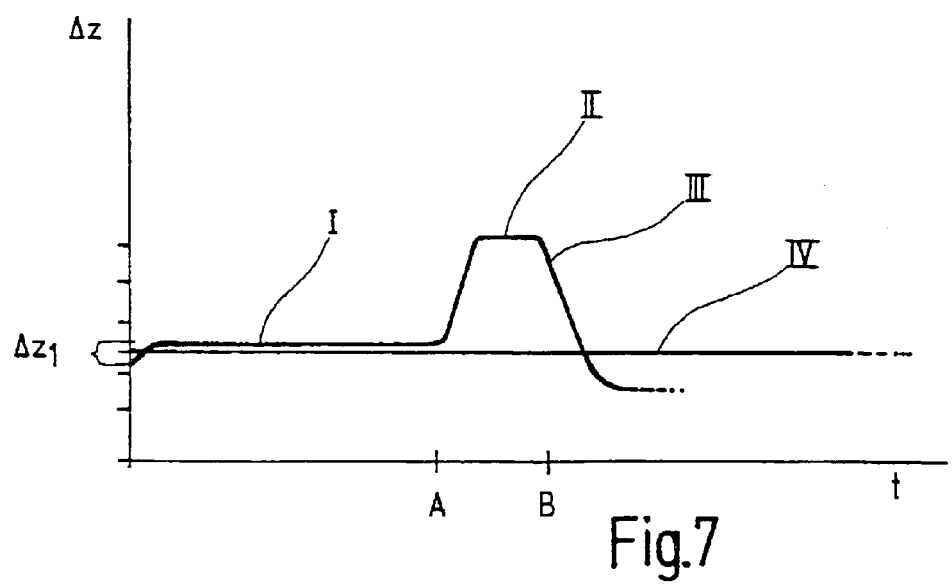
FIG. 7 shows changes in length in the work spindle over time, during machining with and without temperature compensation for comparison.

In FIG. 5, the plate 46 initially has an oversize, which is represented by a dot-dash line 49. This oversize is not removable by grinding, at least not at reasonable effort and expense. Accordingly, the grinding and erosion head is made to approach the flat side of the plate 46 in such a way that an erosion tool, such as the tool 9, is positioned at a slight spacing from the flat side of the plate 46. An electroerosive process of removing material is now performed, in which the tool 9 rotates at a low speed, such as 200 rpm, and a corresponding current flows between the tool 2 and the tool 9. For illustrating the invention, it will first be assumed here that the temperature compensation by means of the sensors 26, 31 is not in operation. Because of the rotation of the shaft 5 and the power generally converted into heat in the machine 1, the shaft 5 assumes a temperature that causes an increase in the length of the shaft 5, as represented in FIG. 7 by a curve branch I. As long as the erosive machining lasts— which can be several hours—this value does not change very much.

Figure 6:
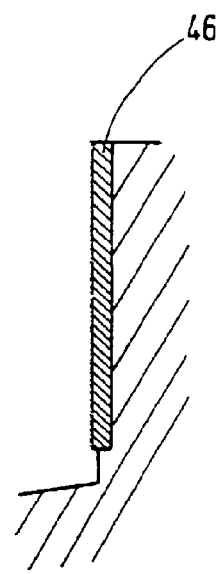

Once the erosive machining is ended, the plate 46 has the rough surface illustrated in FIG. 6. It must now be smoothed in a grinding operation. To that end, the shaft 5 of the grinding and erosion head 3 is speeded up to a speed of 3000 rpm, for instance, and a grinding tool, such as the tool 6, is brought into engagement with the flat side of the plate 46 so as to perform a grinding operation, which for instance lasts several minutes. Because of the power converted, the temperature of the shaft rises in the process, so that the longitudinal expansion in the Z direction increases, as is illustrated in FIG. 7 within a time period A, B (curve branch II).

Once the grinding operation has been performed, the temperature of the shaft 5 drops again, as indicated by the curve branch III.

These changes in length of the shaft 5 in the Z direction lead to reduced precision at the tool 2. The temperature of the shaft 5 is therefore detected with the sensors 26, 31. In the period of time during the erosive machining operation, in which only a slight longitudinal expansion $\Delta Z1$ was found, the expansion is compensated to a value that is constant over the entire period of time of the erosive machining. If the grinding operation is then begun, after a passage through the instant A, the temperature of the shaft is detected, and the control values are increased or decreased by suitable corrective amounts. As a result, a temperature-dictated shift in the tool is avoided, and the positioning of the tool remains constant. This is represented in FIG. 7 by the straight line IV.

Independently of the exemplary embodiment presented, which is based here on a combined grinding and erosion machine, the invention can also be employed in a machine that is used purely for grinding. There as well, it has major advantages, because temperature changes in the machine, of the kind that can certainly occur from a change in the temperature of the coolant-lubricant over relatively long periods of time, are compensated for.

A machine for machining a workpiece with at least one revolving or rotating tool has a work spindle with a shaft 5, whose temperature is monitored by means of at least one temperature sensor 26. The temperature sensor is detected in contactless fashion. The sensor 26 is preferably a radiation-sensitive sensor, which detects the temperature radiation output by the shaft 5. In triggering the positioning drive mechanisms, the control unit 35 of the machine 1 takes into account the temperature expansions of the shaft 5 that result from the temperature changes in the shaft. The positioning drive mechanisms serve to position a tool 6, carried by the shaft 5, relative to the workpiece 2. A machining precision is thus achieved that is independent of the temperature and temperature changes of the machine 1 overall, of temperature changes in the coolant-lubricant, and of temperature changes in the tool 6 and the shaft 5, that can all be caused by the power converted at the machining site.

What is claimed is:

1. A machine for machining a workpiece with at least one revolving or rotating tool,
   having a work spindle, to which a shaft belongs that is rotatably supported and driven to rotate in a mount;
   having a chucking device, which is arranged for holding the workpiece;
   having a positioning device, by means of which the work spindle and the chucking device can be positioned and moved relative to one another;
   having a contactless temperature detecting device which generates a signal that characterizes the temperature of the, shaft at at least one point;
   having a control unit, which controls at least the positioning device in accordance with control values that are ascertained from predetermined values, and which is connected to the temperature detecting device in order to obtain the signal characterizing the temperature and to convert the control values into the predetermined values on the basis of the signal.

2. The machine of claim 1, characterized in that the temperature detecting device has at least one temperature sensor, which detects thermal radiation output by the shaft.

3. The machine of claim 2, characterized in that the temperature sensor has a three-dimensional detection region, within which thermal radiation is detected, and that the temperature sensor is disposed such that a shaft portion is located in the detection region.

4. The machine of claim 3, characterized in that the shaft portion located in the detection region is located between a work tool, carried by the shaft, and a bearing device.

5. The machine of claim 3, characterized in that the shaft portion located in the detection region is located between two bearing devices provided for supporting the shaft.

6. The machine of claim 1, characterized in that for supporting the shaft, one fixed bearing, which allows no axial motion of the shaft, and one bearing device, which allows an axial motion of the shaft, are provided.

7. The machine of claim 2, characterized in that two temperature sensors belong to the detection device.

8. The machine of claim 7, characterized in that the fixed bearing is disposed between the temperature sensors.

9. The machine of claim 3, characterized in that the shaft has a low-reflection surface, at least in the region of the shaft portion located in the detection region.

10. The machine of claim 9, characterized in that the shaft is provided with a surface coating.

11. The machine of claim 7, characterized in that the shaft is burnished.

12. The machine of claim 1, characterized in that the positioning device includes a position sensor device, with which the relative position of the chucking device and the work spindle is detectable and which generates the actual position signals.

13. The machine of claim 12, characterized in that the position of the work spindle is determined by the position of an axially immovable bearing device.

14. The machine of claim 12, characterized in that the control unit controls the work spindle in accordance with the control values and the actual position signals.

15. The machine of claim 13, characterized in that the control unit determines the actual position signals by adding the dimensions, compensated on the basis of the measured temperature, of the shaft portion located between the bearing device and the tool, as well as the dimensions of the tool, to the measured position of the bearing device.

16. The machine of claim 15, characterized in that the control unit additionally temperature-compensates the dimensions of the tool.

17. The machine of claim 1, characterized in that to the machine comprises a machine frame and temperature sensors, which are connected to the control unit.

18. The machine of claim 1, characterized in that the work spindle carries at least one grinding tool.

19. The machine of claim 1, characterized in that the work spindle carries at least one erosion tool.

* * * * *